United States Patent [19]

LaLonde et al.

[11] Patent Number: 5,782,489
[45] Date of Patent: Jul. 21, 1998

[54] AIR BAG WITH ADHESIVE AT SEAMS

[75] Inventors: Gary R. LaLonde, Clinton Township; Al S. Emambakhsh; Xingyuan Sun, both of Rochester Hills, all of Mich.; Carlos H. Murillogalindo, Chihuahua, Mexico

[73] Assignee: TRW Vehicle Safety Systems Inc., Lyndhurst, Ohio

[21] Appl. No.: 701,828

[22] Filed: Aug. 23, 1996

[51] Int. Cl.$^6$ ............................................. B60R 21/20
[52] U.S. Cl. ........................................... 280/743.1
[58] Field of Search ............................ 280/743.1

[56] References Cited

U.S. PATENT DOCUMENTS

| | | | |
|---|---|---|---|
| 3,990,726 | 11/1976 | Oka et al. | 280/739 |
| 4,963,412 | 10/1990 | Kokeguchi | 428/137 |
| 5,094,476 | 3/1992 | Chihaya | 280/743.1 |
| 5,114,180 | 5/1992 | Kami et al. | 280/743.1 |
| 5,193,847 | 3/1993 | Nakayama | 280/738 |
| 5,240,283 | 8/1993 | Kishi et al. | 280/743.1 |
| 5,335,936 | 8/1994 | Faigle et al. | 280/728.2 |
| 5,398,968 | 3/1995 | Emambakhsh et al. | 280/743.1 |
| 5,501,259 | 3/1996 | Palm | 280/743.1 |
| 5,577,765 | 11/1996 | Takeda et al. | 280/743.1 |

*Primary Examiner*—Kenneth R. Rice
*Attorney, Agent, or Firm*—Tarolli, Sundheim, Covell, Tummino & Szabo

[57] ABSTRACT

An air bag (10) comprises an adhesive material (60) located between and interconnecting first and second panels (40, 50). A stitching section (70) extends through the first panel (40) and through the adhesive material (60) and through the second panel (50) to block relative movement between the first and second panels. The adhesive material resists separation of the yarns (56, 58) of the panels (40, 50). The adhesive material (60) also fills thread openings (94) in the second panel (50) around the stitching section (70).

13 Claims, 2 Drawing Sheets

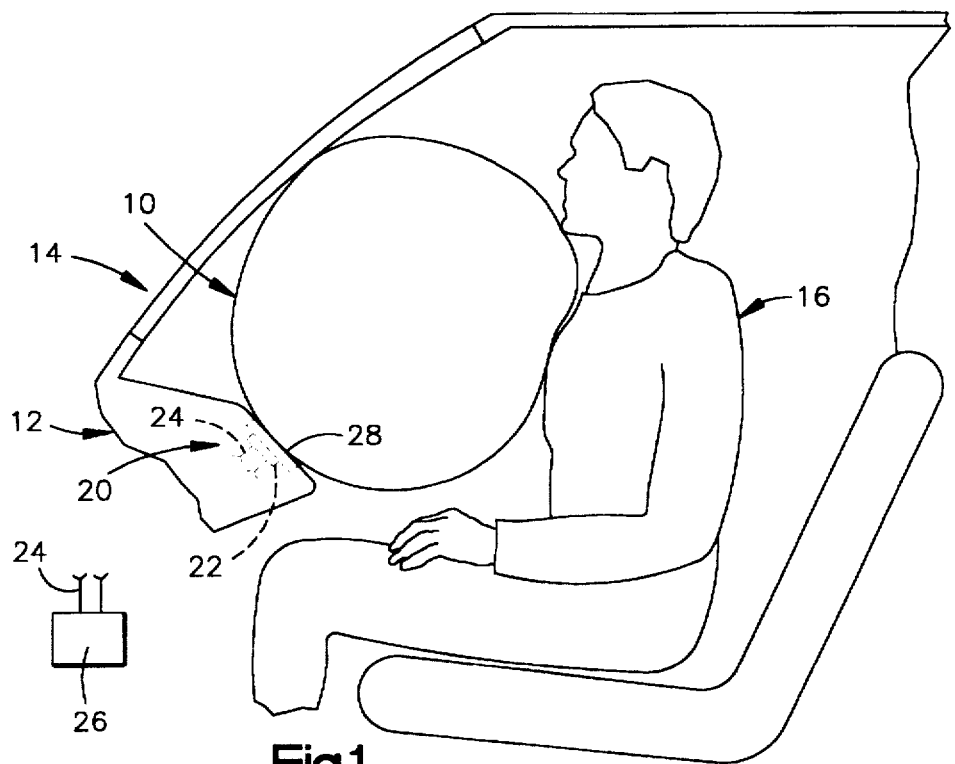
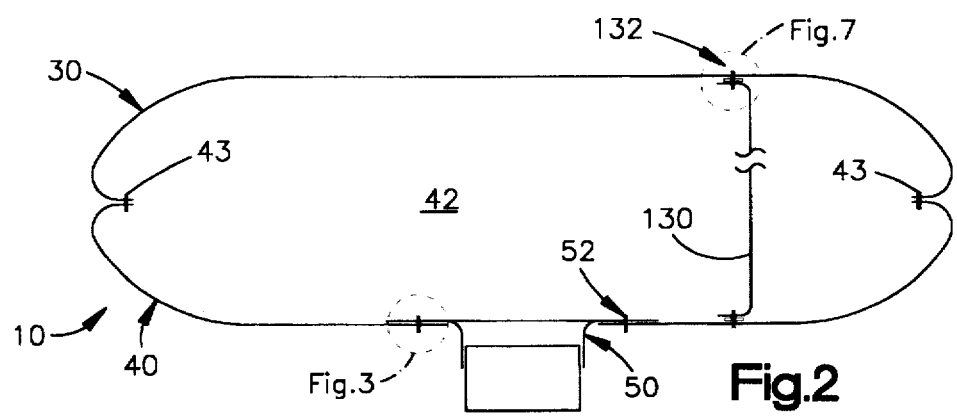
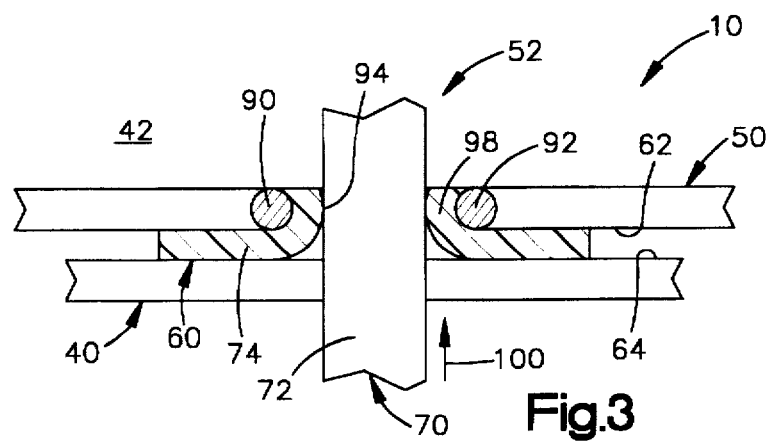

5,782,489

AIR BAG WITH ADHESIVE AT SEAMS

BACKGROUND OF THE INVENTION

1. Technical Field

The present invention relates to a vehicle safety apparatus and, in particular, relates to an inflatable vehicle occupant protection device, such as an air bag, for helping to protect a vehicle occupant.

2. Description of the Prior Art

It is known to inflate an air bag to help protect a vehicle occupant in the event of an impact to a vehicle of a magnitude above a predetermined threshold. The air bag is stored in a deflated condition, together with an inflator, in the instrument panel of the vehicle, for example. In the event of an impact to the vehicle of a magnitude above the predetermined threshold, the inflator is actuated, and the air bag is inflated into a position adjacent to the vehicle occupant. The air bag can help to protect the vehicle occupant from forcefully striking or being struck by parts of the vehicle.

The air bag is typically made from a plurality of fabric material panels which are sewn together with one or more stitching sections along one or more seams. The panels are commonly made from a woven material, that is, a material including a plurality of yarns which are woven together to form the panel. When the air bag is inflated, a substantial amount of stress can be placed on the panels. This stress may cause individual yarns of an air bag panel to separate or move apart from adjacent yarns in that panel. This effect is sometimes known as "combing". This effect may be most pronounced at the location of the seams of the air bag. If the yarns separate from each other, inflation fluid from the inflator can flow between the yarns and cause erosion of the yarns. Such erosion can lead to weakening of the fabric.

SUMMARY OF THE INVENTION

The present invention is an inflatable vehicle occupant protection device for helping to protect an occupant of a vehicle. The protection device is inflatable from a deflated condition to an inflated condition by inflation fluid from an inflation fluid source. The protection device comprises a first panel having a first side surface and a second panel having a second side surface overlying the first side surface on the first panel. An adhesive material is located between the first and second side surfaces and interconnects the first and second panels of the protection device. The protection device includes a stitching section comprising a plurality of stitches which extend through the first panel and through the adhesive material and through the second panel to block relative movement between the first and second panels.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIG. 1 is a schematic view of a vehicle seat and an air bag module including an air bag constructed in accordance with the present invention, showing the air bag in an inflated condition;

FIG. 2 is a schematic view of the air bag of FIG. 1;

FIG. 3 is a schematic sectional view of a portion of a first seam in the air bag of FIG. 1;

DESCRIPTION OF PREFERRED EMBODIMENTS

Figure 4:
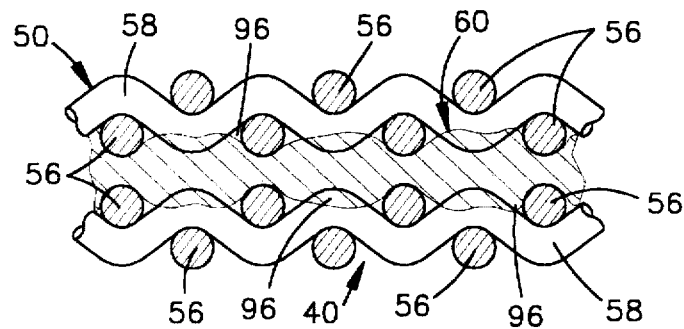
FIG. 4 is an enlarged schematic view of a portion of the seam of FIG. 3.

The present invention relates to a vehicle occupant protection device which is inflatable to help protect an occupant of a vehicle. The present invention is applicable to various inflatable protection device constructions. As representative of the present invention, FIG. 1 illustrates a specific inflatable vehicle occupant protection device 10 of the type commonly known as an air bag. The air bag 10 is illustrated as being inflatable from an instrument panel 12 of a vehicle 14 to help protect an occupant 16 of the vehicle from contact with parts of the vehicle. The air bag 10 could be inflatable from any desired part of the vehicle. Other inflatable vehicle occupant protection devices that can be used in accordance with the present invention include inflatable seat belts, inflatable knee bolsters, inflatable head liners, and knee bolsters operated by inflatable air bags.

The air bag 10 (described below in detail) is part of an air bag module indicated schematically at 20. The module 20 includes, in addition to the air bag 10, an inflator 22. The inflator 22 is connected by lead wires 24 with electric circuitry of the vehicle 14, indicated schematically at 26, which includes a power source, such as the vehicle battery, and a deceleration sensor. A cover (not shown) closes an opening 28 in the instrument panel 12 through which the air bag 10 is inflatable. The cover may form a portion of the vehicle instrument panel 12.

The air bag 10 (FIG. 2) is formed from two separate fabric material panels, that is, a front panel 30 and a back panel 40. The panels 30 and 40 are sewn together at a side seam 43 to form the air bag 10. The panels 30 and 40 define an inflation fluid volume 42 in the air bag 10. A tubular attachment panel or retainer panel 50 (FIG. 2) connects the air bag 10 with the other parts of the module 20. The retainer panel 50 is sewn together with the back panel 40 at a retainer seam 52.

The panels 30, 40 and 50 of the air bag 10 are made from a woven fabric, such as woven nylon. The woven fabric includes a plurality of warp yarns 56 (FIG. 4) which are interwoven with a plurality of fill yarns 58 to form the woven fabric. The fabric is uncoated—that is, it does not have a coating of a fluid impermeable material, as some air bag fabrics do.

The retainer seam 52 (FIGS. 2 and 3) between the retainer panel 50 and the back panel 40 includes a body of adhesive material 60. The body of adhesive material 60 is disposed between a major side surface 62 of the retainer panel 50 and a major side surface 64 of the back panel 40. The retainer seam 52 also includes a stitching section shown schematically at 70. The stitching section 70 is formed in a known manner and includes a plurality of stitches 72 which extend through the retainer panel 50, through the body of adhesive material 60, and through the back panel 40.

Figure 5:
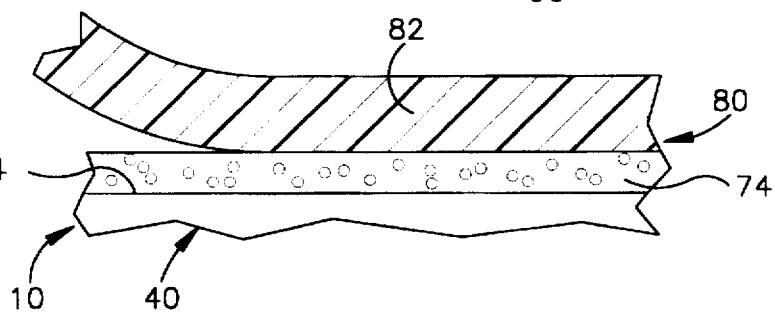
FIG. 5 is a schematic view showing one method of applying adhesive to a seam in the air bag of FIG. 1.

The body of adhesive material 60 is formed by applying adhesive in the form of a layer of adhesive 74 either to the retainer panel 50 or to the back panel 40, before the panels are placed adjacent to each other and sewn together. The layer of adhesive 74 is preferably applied in the manner shown in FIG. 5. As illustrated schematically in FIG. 5, the layer of adhesive 74 forms a part of an acrylic pressure sensitive transfer film 80 which includes a liner 82 and the adhesive layer 74. One suitable brand of transfer film 80 is sold by Can-Do National Tape Company, Product No. C28601. The adhesive material in this transfer film is a tacky, acrylic, pressure sensitive adhesive having a thickness of about 5 mils. The liner material is 76# bleached lay flat silicone treated kraft paper. The liner is about one-half inch wide. Other liner materials can be used. The transfer film is furnished rolled on a core. This product can be purchased from Tapeco, Inc., Nashville, Tenn. Another suitable brand of transfer film is sold by Avery Dennison Company, Product No. P-26 adhesive.

To apply the adhesive material 74 to the air bag 10, the transfer film 80 is applied to, for example, the major side surface 64 of the back panel 40, prior to placing the back panel in abutting engagement with the retainer panel 50. The liner 82 is then peeled off as shown schematically at the left side of FIG. 5. The layer of adhesive 74 remains on the back panel 40.

The back panel 40 (FIG. 3) is then assembled with the retainer panel 50. The retainer panel 50 overlies and is in abutting engagement with the layer of adhesive 74 on the back panel 40. The layer of adhesive 74 engages the major side surface 64 of the back panel 40 and the major side surface 62 of the retainer panel 50. The layer of adhesive 74 is located between and interconnects the back panel 40 and the retainer panel 50.

The back panel 40 and the retainer panel 50 are, thereafter, sewn together with the stitching section 70. Each stitch 72 of the stitching section 70 comprises a thread portion which extends through the back panel 40, the adhesive material 60 and the retainer panel 50.

When the back panel 40 and the retainer panel 50 are sewn together, a first group of the stitches or threads 72, specifically, the majority of the stitches or threads, pass between adjacent yarns 90 and 92 of the retainer panel, as shown schematically in FIG. 3. At each location where one of the first group of threads 72 passes between the yarns of a panel, a small thread opening, such as the opening designated 94, is created in the fabric. The thread openings 94 around the threads 72 are larger than the naturally occurring openings 96 (FIG. 4) between adjacent interwoven yarns 56 and 58 of the woven fabric material of the air bag 10. The thread openings 94 (FIG. 3) are not completely filled by the threads 72—that is, some open space remains around the threads.

The adhesive material 60 through which the thread 72 extend acts as a filler material and flows into the thread openings 94 to close at least partially the thread openings. Thus, as illustrated schematically in FIG. 3, an annular portion 98 of the adhesive material 60 flows into or is disposed in the thread opening 94. The adhesive material portion 98 is drawn into the thread opening 94 by the needle (not shown) and thread 72 which are moving in the direction 100 during insertion of the thread. The adhesive material portion 98 fills and seals the thread opening 94 around the thread 72.

Some of the adhesive material 60 also flows into the naturally occurring openings 96 (FIG. 4) between the warp and fill yarns 56 and 58 of each of the panels at the seams, to close at least partially those openings. The adhesive material 60 adheres intimately to the warp and fill yarns 56 and 58 of the panels.

Figure 6:
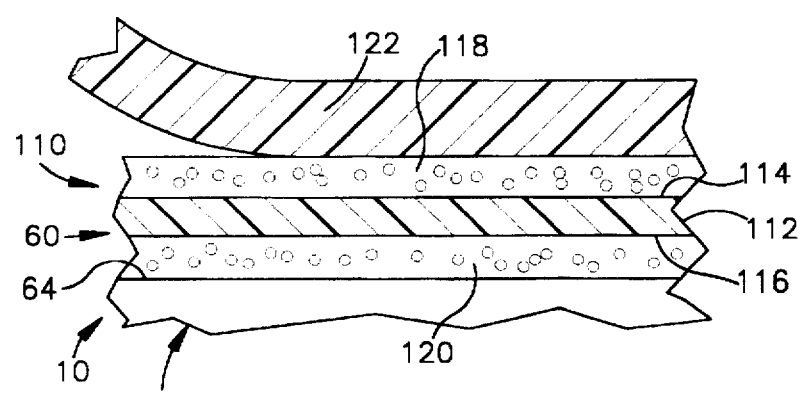
FIG. 6 is a schematic view similar to FIG. 5 showing a second method of applying adhesive to a seam in the air bag of FIG. 1.

The body of adhesive material 60 at the retainer 52 seam may, alternatively, be formed in the manner shown in FIG. 6. FIG. 6 illustrates schematically a portion of a piece of adhesive tape or transfer film 110 of the type commonly known as "double-sided" or "double-stick" tape. A suitable brand of transfer film 110 is available from the same sources identified above with respect to the transfer film 80.

The transfer film 110 includes a carrier 112 having first and second opposite side surfaces 114 and 116. A first layer of adhesive 118 is disposed on the first side surface 114 of the carrier 112. A second layer of adhesive 120 is disposed on the second side surface 116 of the carrier 112. A liner 122 covers the first layer of adhesive 118.

If the transfer film 110 is used to form the retainer seam 52, the transfer film is applied to the back panel 40 of the air bag 14. The second layer of adhesive 120 is in abutting engagement with the major side surface 64 of the back panel 40. The liner 122 is peeled off as shown schematically in FIG. 6. The second layer of adhesive 120 remains on the air bag 10. The second layer of adhesive 120 supports the carrier 112 and the first layer of adhesive 118.

The retainer panel 50 is then assembled with the back panel 40. The adhesive layers 118 and 120, together with the carrier 112, form the body of adhesive material 60 which is located between and interconnects the back panel 40 and the retainer panel 50. The panels 40 and 50 are, thereafter, sewn together with the stitching section 70. The stitching section 70 extends through the panels 40 and 50 and through the body of adhesive material 60, including the carrier 112 and the two layers of adhesive 118 and 120.

Figure 7:
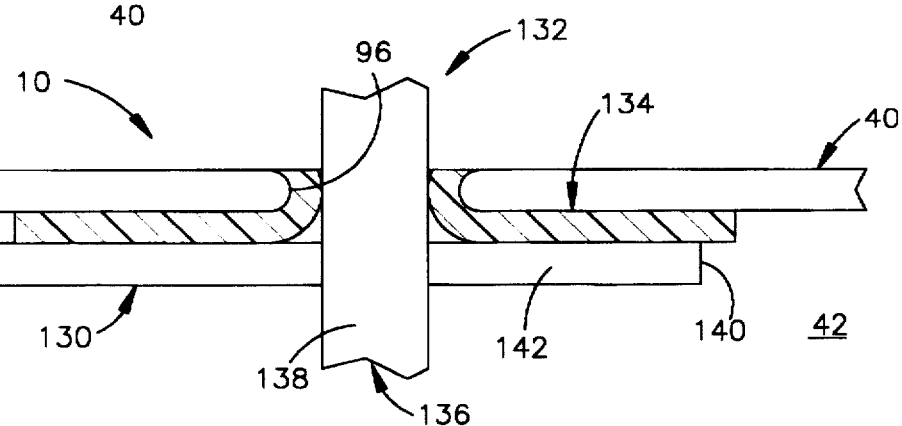
FIG. 7 is view similar to FIG. 3 showing a portion of a second seam in the air bag of FIG. 1.

The air bag 10 includes a vent panel 130 illustrated schematically in FIG. 2. The vent panel 130 is sewn between the front panel 30 and the back panel 40 at a seam 132 (FIGS. 2 and 7). Adhesive material 134 is located at the vent panel seam 132. The adhesive material 134 is located between and interconnects the vent panel 130 and the front and back panels 30 and 40, as illustrated schematically in FIG. 7. The adhesive material 134 may be the same as, and formed in the manner as, the adhesive material 60 (FIG. 3).

The vent panel 130 is sewn to the back panel 40 (FIG. 7) with a stitching section 136 including at least one thread portion 138. The stitching section 136 including the thread portion 138 is spaced apart from the edge 140 of the vent panel 130. The portion 142 of the vent panel 130 which is between the stitching section 136 and the edge 140 of the vent panel is commonly called the seam allowance. The seam allowance of a panel sewn in an air bag, such as the air bag 10, typically has a width of from about one half inch to one inch as measured between the panel edge and the stitching section.

In the event of a vehicle emergency situation, such as sudden vehicle deceleration, for which inflation of the air bag 10 is desired to help protect the vehicle occupant 16 (FIG. 1), the deceleration sensor in the vehicle electric circuitry 26 causes electric current to be supplied over the lead wires 24 to the inflator 22. The inflator 22 is actuated, in a known manner, to direct inflation fluid into the retainer panel 50 of the air bag 10. Inflation fluid under pressure from the inflator 22 flows into the inflation fluid volume 42 of the air bag 10 to inflate the air bag. The air bag 10, when inflated, is disposed generally in a position in front of the vehicle occupant 16.

During inflation of the air bag 10, inflation fluid under pressure is directed at the seams of the air bag. At the same time, the force of the inflating air bag 10 places a substantial amount of stress on the seams of the air bag. This stress may in some instances tend to urge individual warp yarns 56 or fill yarns 58 of a panel to separate from adjacent yarns in that panel. If such separation occurs, inflation fluid can flow through the panel in an undesirable amount.

The adhesive material in the seams of the air bag 10 helps to minimize separation of the yarns by blocking relative movement of the yarns in the fabric. For example, the adhesive material 60 (FIG. 4) which is in contact with the warp yarns 56 and the fill yarns 58 in the retainer panel 50 resists relative movement of the yarns in the retainer panel at the time of inflation. The adhesive material 60 also resists relative movement of the warp yarns 56 and the fill yarns 58 in the back panel 40. As a result, separation of the yarns of the fabric material of the air bag 10, at the location of the seams of the air bag, is minimized.

The adhesive material which is located in the thread openings of the air bag 10, such as the thread opening 94 (FIG. 3), at the time of inflation, minimizes the flow of inflation fluid through the thread openings. This can help to minimize erosion of the yarns of the air bag 10 at the location of the seams of the air bag.

The adhesive material 134 (FIG. 7) which is disposed between the back panel 40 and the seam allowance 142 of the vent panel 130 prevents the seam allowance from lifting up and moving away from the back panel. This prevents inflation fluid from flowing between the seam allowance 142 and the back panel 40 and, thereby, from reaching the thread portions 138 and the thread openings 96. This blockage of flow of inflation fluid can help to protect the material of the air bag 10 at the location of the seams of the air bag.

Figure 8:
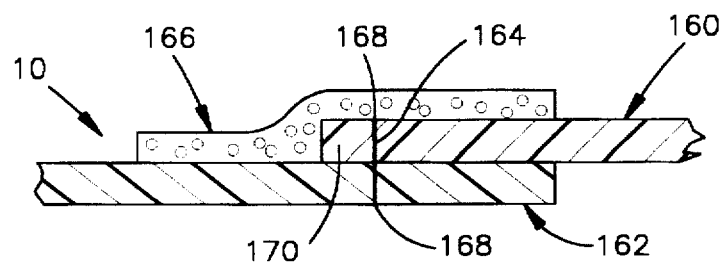
FIG. 8 is a schematic sectional view of a portion of a third seam of the air bag of FIG. 1.

FIG. 8 illustrates the use of a layer of adhesive material over a previously sewn seam rather than in a seam prior to sewing. In FIG. 8, two panels 160 and 162 of the air bag 10 are sewn together with a stitching section 164. Each one of the panels 160 and 162 is made from a woven fabric, such as woven nylon, and includes a plurality of warp yarns and fill yarns (not shown in FIG. 8) which are interwoven to form the fabric. The fabric which forms the panels 160 and 162 is uncoated fabric.

A layer of adhesive 166 overlies the stitching section 164 and overlies the sewn portions of the panels 160 and 162. A portion of the material of the adhesive layer 166 flows into the naturally occurring openings (not shown in FIG. 8) between the individual yarns of the panels 160 and 162. The material of the adhesive layer 166 also flows into the thread openings 168 formed in the panels 160 and 162 when the stitching section 164 is added. The adhesive layer 166 overlies the seam allowance portion 170 of the panel 160.

When the air bag 10 is inflated, the adhesive material 166 resists separation of the yarns in the panels 160 and 162 by resisting relative movement of the yarns in the fabric. The adhesive material 166 which is located in the thread openings 168 minimizes or blocks the flow of inflation fluid through the thread openings. The adhesive material 166 can also prevent the seam allowance 170 of the panel 160 from lifting up and moving away from the panel 162.

From the above description of the invention, those skilled in the art will perceive improvements, changes and modifications in the invention. Such improvements, changes and modifications within the skill of the art are intended to be covered by the appended claims.

Having described the invention, we claim:

1. An inflatable vehicle occupant protection device for helping to protect an occupant of a vehicle, said protection device being inflatable from a deflated condition to an inflated condition by inflation fluid from an inflation fluid source, said protection device comprising:

a first panel having a first side surface;

a second panel having a second side surface overlying said first side surface on said first panel;

an adhesive material located between said first and second side surfaces and interconnecting said first and second panels of said protection device; and a stitching section including a plurality of stitches which extend through said first panel and through said adhesive material and through said second panel to block relative movement between said first and second panels.

2. A protection device as set forth in claim 1 wherein said first panel is made from yarns woven together to form said first panel, said adhesive material being in intimate contact with a plurality of said yarns in said first panel and resisting movement of said plurality of yarns in said first panel relative to each other upon inflation of said protection device.

3. A protection device as set forth in claim 2 wherein said second panel is made from yarns woven together to form said second panel, said adhesive material being in intimate contact with a plurality of said yarns in said second panel and resisting movement of said plurality of yarns in said second panel relative to each other upon inflation of said protection device.

4. A protection device as set forth in claim 1 wherein said adhesive material comprises a carrier strip having first and second opposite side surfaces, a first layer of adhesive on said first side surface of said carrier strip, and a second layer of adhesive on said second side surface of said carrier strip;

said first layer of adhesive being located between and interconnecting said carrier strip and said first panel;

said second layer of adhesive being located between and interconnecting said carrier strip and said second panel.

5. A protection device as set forth in claim 1 wherein said adhesive material comprises a layer of adhesive forming a portion of a transfer tape, said transfer tape further comprising a liner for applying said layer of adhesive to said protection device.

6. A protection device as set forth in claim 1 wherein said adhesive material is a tacky acrylic pressure sensitive adhesive material.

7. A protection device as set forth in claim 1 wherein said first panel is made from a plurality of yarns woven together to form said first panel, said plurality of stitches including a first group of said stitches, each stitch of said first group of said stitches comprising a thread portion which extends through a respective thread opening between adjacent yarns in said first panel, said adhesive material extending into at least some of said thread openings and blocking flow of inflation fluid through said at least some of said thread openings.

8. A protection device as set forth in claim 7 wherein said adhesive material is in intimate contact with said yarns in said first panel and resists movement of said yarns in said first panel relative to each other upon inflation of said protection device.

9. A protection device as set forth in claim 1 wherein said first panel has an edge spaced apart from said stitching section, a seam allowance portion of said first panel extending between said edge and said stitching section, said adhesive material being located between and interconnecting said second panel and said seam allowance portion of said first panel and blocking movement of said seam allowance portion of said first panel in a direction away from said second panel upon inflation of said protection device.

10. A protection device as set forth in claim 9 wherein said seam allowance portion of said first panel has a width between said edge and said stitching section in the range of from about one half inch to about one inch.

11. An inflatable vehicle occupant protection device for helping to protect an occupant of a vehicle, said protection device being inflatable from a deflated condition to an inflated condition by inflation fluid from an inflation fluid source, said protection device comprising:

a first panel having a first side surface;

a second panel having a second side surface overlying said first side surface on said first panel;

a filler material located between said first and second side surfaces of said first and second panels of said protection device; and a stitching section including a plurality of stitches which extend through thread openings in said first panel and through said filler material and through said second panel to block relative movement between said first and second panels;

said filler material extending into said thread openings in said first panel and blocking flow of inflation fluid through said thread openings.

12. A protection device as set forth in claim 11 wherein said filler material comprises an adhesive material which interconnects said first and second panels of said protection device.

13. A protection device as set forth in claim 12 wherein said adhesive material is a tacky acrylic pressure sensitive adhesive material.

* * * * *